Patented May 29, 1923.

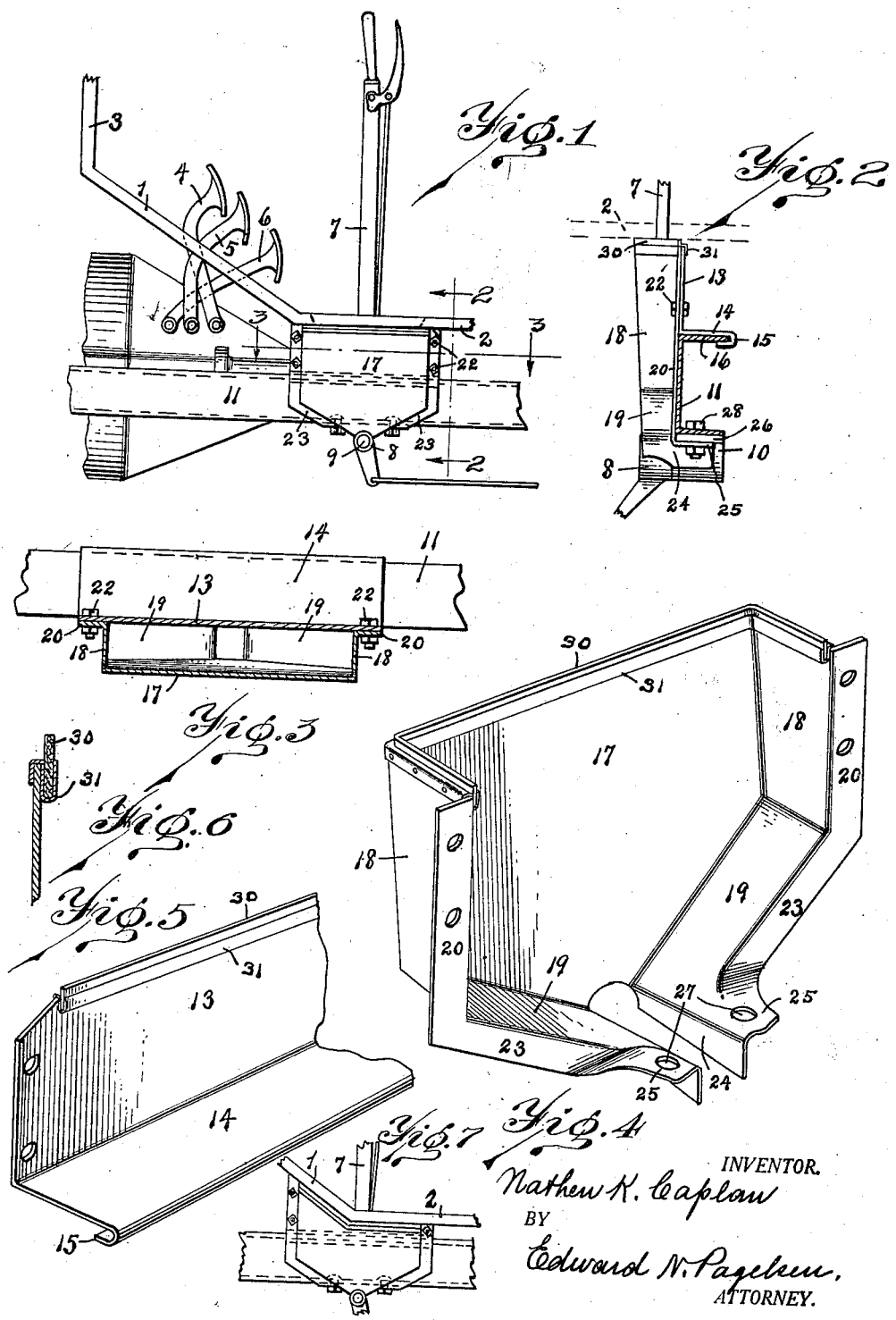

1,456,971

UNITED STATES PATENT OFFICE.

NATHEN K. CAPLAN, OF DETROIT, MICHIGAN.

DRAFT PREVENTER.

Application filed June 29, 1921. Serial No. 481,257.

*To all whom it may concern:*

Be it known that I, NATHEN K. CAPLAN, a citizen of the United States, and residing at Detroit, in the county of Wayne and State of Michigan, have invented a new and Improved Draft Preventer, of which the following is a specification.

This invention relates to means for preventing blasts of air from blowing up through the openings in the floor boards of automobiles around the operating levers, especially around the emergency brake levers of "Ford" cars, and its object is to provide a device of this character which may be produced at low cost and which can be attached quickly in proper position without any preparation of the automobile to receive it.

This invention consists of a case, preferably formed of sheet metal, extending from the lower side of the floor of an automobile and around one of the control levers, the case being attached to the frame of the vehicle and engaging the hub of the control lever so as to constitute a closed pocket in which the control lever is movable.

It further consists in the details of construction illustrated in the accompanying drawing and particularly pointed out in the claims.

In the drawing, Fig. 1 is a side elevation of this draft preventer enclosing the lower end of the operating lever of the emergency brake of a Ford automobile. Figs. 2 and 3 are sections on the lines 2—2 and 3—3 of Fig. 1. Figs. 4 and 5 are perspectives of the two parts of the draft preventer. Fig. 6 is a section of an upper edge of the casing. Fig. 7 is a side elevation of a modified form of casing.

Similar reference characters refer to like parts throughout the several views.

In Fig. 1, 1 and 2 indicate the floor of a Ford automobile and 3 the dash. The pedals 4, 5 and 6 extend through the inclined portion 1 or foot board and the lever 7 which controls the emergency brake extends through a slot in the floor 2 and connects to a hub 8 rotatable with the shaft 9 which is held in a bearing 10 attached to the lower face of the side frame 11.

The draft preventer consists of two parts, one of which comprises the vertical portion 13 and the horizontal portion 14 whose edge 15 is adapted to fit around the flange 16 of the upper side frame 11. The second part comprises the side 17 and the flanges 18 and 19, the flanges 18 having out-turned edges 20 connecting to the vertical portion 13 by means of bolts 22 and also fitting against the web of the side frame, and the flanges 19 having out-turned edges 23 fitting against the web of the side frame 11. The lower edges 24 of the flanges 19 extend around the hub 8 and bearing 10, and may have lips 25 fitting against the flanges 26 of the bearing 10 and having holes 27 to receive the bolts 28 which secure the bearing to the frame 11, although these lips may be omitted if desired.

As the only opening in the draft preventer is at the top and is larger than the slot in the floor 2 through which the lever 7 extends, and as the upper edges bear against the bottom of the floor 2, the very objectionable cold blast which usually blows up around the lever 7 during winter weather is entirely stopped.

In order to secure a close joint between the upper edge of the casing and the lower side of the floor, I attach a packing strip 30 of rubber, felt or any other suitable material to the upper edge of the casing, an S-shaped strip 31 of sheet metal being employed to secure the packing strip in position. When necessary, the sides of the case may be formed to fit the boards 1 and 2, as indicated in Fig. 7, the general construction of the case, however, remaining the same.

The dimensions and details of this draft preventer may all be changed by those skilled in the art to fit it to the different cars without departing from the spirit of my invention as set forth in the following claims.

I claim:—

1. A draft preventer comprising a two part casing extending from the floor of an automobile around a control lever, a vehicle frame member constituting a portion of the casing, one of the parts also attaching to a portion of the frame of the vehicle and the other part fitting against said frame and against the hub of the control lever and being of sufficient size to permit free operation of the control lever.

2. A draft preventer comprising a casing extending down from the floor of an automobile around a control lever to the hub thereof and to the bearing for the control lever shaft and attached to the frame of the automobile by means of the bolts securing said bearing and of sufficient size to permit the operation of the control lever and having an upper end in engagement with the floor of greater dimensions than the slot in the floor through which the lever extends and a vehicle frame member to which the casing is attached.

3. A draft preventer comprising a two part casing extending from the floor of an automobile around a control lever, a vehicle frame member, one of the parts also attaching to a portion of the frame of the vehicle and the other part fitting against said frame and against the hub of the control lever and being of sufficient size to permit free operation of the control lever, and means to secure the two parts of the casing together.

NATHEN K. CAPLAN.